United States Patent [19]

Bergk

[11] Patent Number: 5,625,540

[45] Date of Patent: Apr. 29, 1997

[54] ELECTRONIC SWITCHED-MODE POWER SUPPLY

[75] Inventor: Günther Bergk, Niedernhausen, Germany

[73] Assignee: Braun Aktiengesellschaft, Kronberg, Germany

[21] Appl. No.: 307,816

[22] PCT Filed: Feb. 17, 1993

[86] PCT No.: PCT/DE93/00169

§ 371 Date: Sep. 27, 1994

§ 102(e) Date: Sep. 27, 1994

[87] PCT Pub. No.: WO93/21679

PCT Pub. Date: Oct. 28, 1993

[30] Foreign Application Priority Data

Apr. 10, 1992 [DE] Germany .................... 42 12 041.1

[51] Int. Cl.⁶ .................................................. H02J 7/10
[52] U.S. Cl. ............................................................. 363/21
[58] Field of Search ......................... 363/18–21; 331/112

[56] References Cited

U.S. PATENT DOCUMENTS 4,965,506  10/1990  Algra et al. ............................. 320/23

FOREIGN PATENT DOCUMENTS

| 2200935 | 6/1975 | Denmark . |
| 0162341 | 5/1983 | European Pat. Off. . |
| 0226253 | 12/1986 | European Pat. Off. . |

Primary Examiner—Aditya Krishnan
Attorney, Agent, or Firm—Fish & Richardson, P.C.

[57] ABSTRACT

An electronic switched-mode power supply for supplying current to an accumulator and to an electrical load adapted to be switched on, includes a self-oscillating flyback converter having a transformer, a switching transistor with an emitter resistor, a feedback circuit, and a control circuit influenced by the accumulator voltage. The power supply further includes an interrupting device which turns the switching transistor off for a prolonged period when, with the switched-mode power supply in the pulsating mode, the ratio of oscillation off-time to the duration of oscillation bursts exceeds a predetermined magnitude.

11 Claims, 4 Drawing Sheets

ELECTRONIC SWITCHED-MODE POWER SUPPLY

This invention relates to an electronic switched-mode power supply for supplying current from an input voltage source to an accumulator and to an electrical load adapted to be switched on, comprising a self-oscillating flyback converter having a transformer whose primary winding, in series arrangement with the collector-emitter circuit of a first transistor and an emitter resistor, is connected in parallel with the input voltage source, and whose secondary winding is connected in series with the accumulator and a first diode, with the base of the first transistor being connected to the secondary winding through a feedback circuit in addition to being coupled to a control circuit inhibiting conduction of the first transistor when the voltage at the accumulator has reached a set point, and enabling it to conduct again after the voltage has dropped below this set point or a predetermined lower value.

A switched-mode power supply of this type is known, for example, from EP-0 162 341 B1 or from prior German patent application No. P 41 22 544.9-32. In both circuit arrangements, the trickle charging current (continuous charging current) after the accumulator is fully charged amounts to about 10% of the charging current initially flowing when the accumulator is depleted.

In some types of accumulator as, for example, nickel hydride accumulators, even a low trickle charging current has a detrimental effect on the service life. Small household appliances such as electric shavers or electric toothbrushes are often kept in wall mounts through which the accumulator is recharged. Such appliances are accordingly permanently connected to the input voltage source (the line), so that in conventional switched-mode power supplies with self-oscillating flyback converters a continuous charging current (trickle charging current) flows to the accumulator.

It is an object of the present invention to prolong the service life of the accumulator of such appliances.

This object is accomplished in that an interrupting device is provided turning the first transistor off for a prolonged period when, with the switched-mode power supply in the pulsating mode, the ratio of oscillation off-time to the duration of oscillation bursts exceeds a predetermined magnitude.

The magnitude of this ratio is advantageously selected such as to correspond to the normally flowing trickle charging current. It is thereby ensured that the accumulator is fully charged before the first transistor is turned off for a prolonged period.

The interrupting device is configured such as to enable the first transistor to conduct again not until after the switched-mode power supply was previously disconnected from the input voltage source (power plug pulled or removed from the wall mount), or until the electrical load was switched on (motor power on), or until the accumulator voltage has dropped below its set point significantly, meaning, for example, that only a half charge remains in the accumulator.

Advantageously, the interrupting device is configured in such a manner that a capacitor connected to the base of a turn-off transistor is charged during oscillation off-time of the flyback converter, discharging during the occurrence of oscillation bursts, whereby the turn-off transistor is rendered conducting from a specified ratio of pulse spaces to pulses, turning the first transistor off for a prolonged period.

Further features will become apparent from the other subclaims.

Embodiments of the present invention will be described in more detail in the following with reference to the accompanying drawings. In the drawings, FIG. 1 is a schematic circuit diagram of an electronic switched-mode power supply incorporating an interrupting device:

Figure 1:
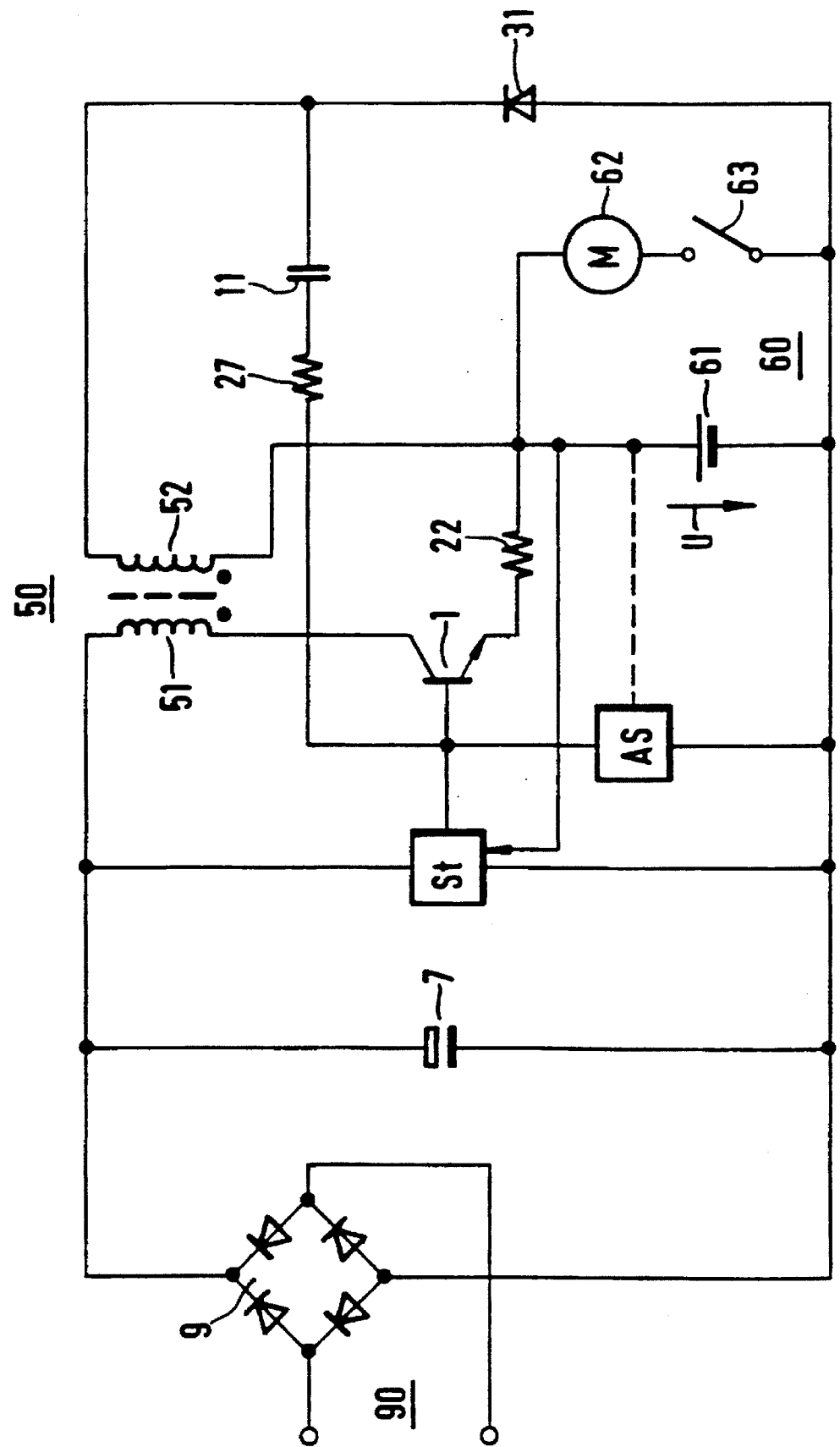

The schematic circuit diagram of an electronic switched-mode power supply shown in FIG. 1 is comprised of a flyback converter energized from a DC or AC supply 90 through a bridge rectifier arrangement 9. Connected in parallel to the DC input terminals of the bridge rectifier arrangement 9 is an input capacitor 7 for filtering and smoothing the input voltage.

Connected in parallel with the input capacitor 7 is the series arrangement comprising the primary winding 51 of a transformer 50 and the load circuit of a transistor 1 and a resistor 22. The secondary winding 52 of the transformer 50 is connected in series with a diode 31 and a load arrangement 60. The load arrangement is comprised of an accumulator 61 and an electrical load 62 as, for example, a direct-current motor, which is adapted to be switched on by a switch 63.

Through a feedback circuit comprised of the series arrangement of a feedback resistor 27 and a feedback capacitor 11, the base of transistor 1 is connected to the one end of the secondary winding 52 of the transformer 50, and to a control circuit St. The control circuit St is influenced by the voltage U at the accumulator 61, that is, when a predetermined voltage U is reached, transistor 1 will be cut off, preventing it from starting again immediately with the buildup of oscillations, and it is only after the voltage U has dropped that the transistor will be brought back into conduction. In this manner, oscillation bursts occur (periods of time in which the flyback converter is oscillating), with pauses between the bursts. The closer the accumulator comes to a fully charged condition, the longer becomes the oscillation off-time as compared with the oscillation bursts, until only a low trickle charging current flows.

When the ratio of the duration of pulse spaces to the duration of pulse bursts exceeds a predetermined magnitude which corresponds advantageously to the normally flowing trickle charging current (that is, the accumulator is in the fully charged condition), the interrupting device AS will turn off the base of transistor 1 for a prolonged period.

A "prolonged period" as used herein means that the transistor 1 is not allowed to return to conduction after a brief period only, when the voltage U at the accumulator has dropped only insignificantly.

The interrupting device AS brings transistor 1 back into conduction if the switched-mode power supply was disconnected from the input voltage source 90 (power plug pulled), or if the electrical load 62 is turned on by means of the switch 63, or if the voltage U at the accumulator 61 has dropped below the set point by an appreciable amount. These conditions which, when satisfied, bring transistor 1 back into conduction so as to enable the switched-mode power supply to build up oscillations again, may apply singly or in any combination. In the first embodiment of an interrupting device AS1 of FIG. 2, the off-state of transistor 1 will be canceled again either if the power plug was pulled or if the motor is turned on. In the second embodiment of an interrupting device AS2 of FIG. 3, transistor 1 will be caused to conduct again either if the power plug was pulled or if the voltage at the accumulator has dropped significantly below a value corresponding to the fully charged condition, meaning, for example, that the accumulator holds only 50% of its charge.

Figure 2:
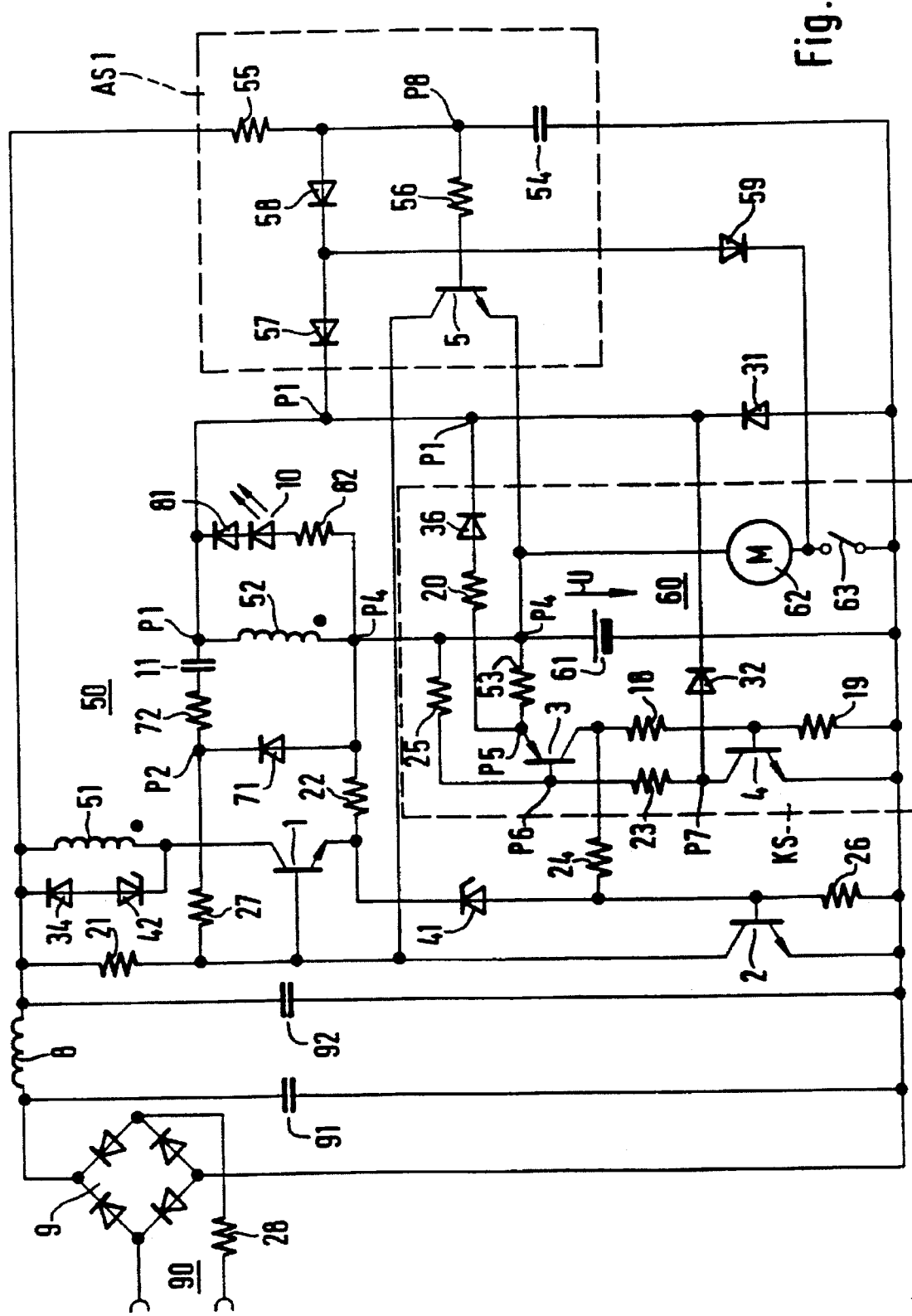
FIG. 2 is a first detailed embodiment with reference to the circuit arrangement described in German patent application No. P 41 22 544.9-32.

FIG. 2 shows an electronic switched-mode power supply comprised of a self-oscillating flyback converter with a transformer 50 and a transistor 1 as well as a diode 31 provided in the load circuit. The flyback converter is energized through a bridge rectifier arrangement 9 and a resistor 28 from a DC or AC supply whose voltage may be in the range of between 100 and 250 volts or, in the extreme, also 12 volts, and whose frequency may be nearly arbitrary where an AC supply is used. The rectified output voltage is applied to the input of the flyback converter or the electronic control and regulating means through a filtering and smoothing arrangement comprised of a series choke 8 and two smoothing capacitors 91, 92.

Connected in parallel with the DC terminals is the series arrangement comprising the primary winding 51 of the transformer 50 and the collector-emitter circuit of the transistor 1, a resistor 22 and an accumulator 61. Connected to the base of transistor 1 is a resistor 21 which is coupled to the positive pole of the input voltage terminal through the series choke 8. In addition, the base of transistor 1 is connected to chassis or reference potential through the collector-emitter circuit of a transistor 2. The emitter of transistor 1 is connected to the cathode of a Zener diode 41 having its anode connected to the base of transistor 2 and also, through a resistor 26, to chassis or reference potential. Moreover, the emitter of transistor 1 is connected through resistor 22 to an end (P4) of the secondary winding 52 of the transformer 50. The direction of winding of the primary and secondary of the transformer 50 is indicated by the dots shown in the Figure.

A feedback capacitor 11 is connected, through a feedback resistor 27, to the base of transistor 1 and directly to the one end (P1) of the secondary winding 52 of the transformer 50. Connected to the other end (P4) of the secondary winding 52 is the load arrangement 60 comprised of an accumulator 61 connected in parallel with a switch 63 and a direct-current motor 62 in series arrangement.

The cathode of the diode 31 arranged in the load circuit is connected to the one end (P1) of the secondary winding 52, while the anode is connected to the end of the accumulator 61 connected to reference potential.

The feedback capacitor 11 is further connected, through a current-limiting resistor 72, to a discharge diode 71 having its cathode on the side close to the feedback capacitor 11 (P2), while its anode is connected to the positive pole (P4) of the accumulator 61. Connected in parallel with the secondary winding 52 between nodes P1 and P4 is a series arrangement of a diode 81, a light-emitting diode 10, and a current-limiting resistor 82.

Parallel to the accumulator 61 is a series arrangement formed by a voltage divider 25/23 and the collector-emitter circuit of a transistor 4. The base of a transistor 3 is tied to the junction (P6) of resistors 25 and 23 providing this voltage divider.

A decoupling diode 36 and a voltage divider 20/50 serially connected thereto are arranged between the one end (P1) of the secondary winding 52 and the positive pole (P4) of the accumulator 61. The emitter of transistor 3 is tied to the junction (P5) of resistors 20 and 53.

The collector of transistor 3 is connected to the base of transistor 2 through a resistor 24, as well as to the base of transistor 4 through a resistor 18. In addition, the base of transistor 4 is connected to reference potential through a resistor 19. A diode 32 is inserted between the collector junction (P7) of transistor 4 and the one end (P1) of the secondary winding 52, the anode of this diode 32 being connected to the collector junction.

To limit the flyback voltage, a circuit is provided in parallel with the primary winding 51 of the transformer 50, comprising a Zener diode 42 and a diode 34 in series arrangement, the diodes having their respective anodes connected to each other.

In the interrupting device AS1, the collector-emitter circuit of a transistor 5 lies between the base of transistor 1 and the positive pole (node P4) of the accumulator 61. Through a resistor 56, the base of transistor 5 is applied to a node P8. Node P8 is connected to reference potential through a capacitor 54, to the positive pole of the input voltage source 90 through a resistor 55, and to the one end of the secondary winding 52 (node P1) through diodes 57 and 58. The diodes 57, 58 have their respective cathodes on the side close to the secondary winding 52, and a further diode 59 is provided between their junction and the one junction of the motor 62, this diode 59 having its cathode side connected to the junction of the motor which is connectible to reference potential by means of the switch 63.

The mode of operation of the circuit arrangement of FIG. 2 will now be explained in greater detail in the following.

Following rectification by means of the bridge rectifier arrangement 9 and filtering and smoothing by means of the series choke 8 and, respectively, the parallel capacitors 91, 92, a low base current will drive, through resistor 21, the transistor 1 operating as a switching transistor. As a result of the first transistor 1 switching on, a positive feedback effect occurs through the switching path of the transistor 1 and the primary winding 51 of the transformer 50, driving the transistor 1 additionally and placing it in the conductive state. The collector current will rise linearly, producing a proportional voltage at resistor 22. When the current has reached a predetermined peak value, transistor 2 will be driven through the Zener diode 41, thereby going into conduction and connecting the base of transistor 1 to reference potential or chassis, whereby base current is withdrawn from transistor 1, cutting transistor 1 off. With the beginning of the off period, the polarity of the voltage induced in the secondary winding 52 of the transformer 50 will be reversed at node P1 of the feedback capacitor 11. In accordance with the principle of a flyback converter, the energy stored in the transformer 50 will thus be delivered to the load 60 through the diode 31.

During the reversal process of the transformer 50, the diode 34 as well as the Zener diode 42 which are connected in parallel with the primary winding 51 of the transformer 50 will limit the flyback voltage peak during the off period.

Because negative potential is present at node P1 of the secondary winding 52 during the entire transformer discharge period, node P7, that is, the junction of resistor 23 and the collector of transistor 4, is connected during this period to reference potential through the diode 32 (assuming like threshold voltages of diodes 31 and 32). The voltage divider 25/23 is dimensioned such that during this current flow period in the secondary circuit the transistor 3 whose base is coupled to the junction P6 of the voltage divider and whose emitter is connected to the positive pole (P4) of the accumulator through resistor 53, becomes conducting near the turn-off voltage of the accumulator. This avoids a premature overdrive of transistor 3 which, in combination with the hysteresis properties of the circuit explained in more detail in the following, results in a sharper turn-off characteristic (see FIG. 4). Transistor 3 being conducting, transistor 2 will also become conducting through resistor 24, transistor 1 being thus maintained in the off-state.

During the time transistor 1 was conducting, the feedback capacitor 11 was charged through the feedback resistor 27, producing a negative polarity at node P2 of the feedback capacitor 11. During the transformer discharge cycle, this charge with negative polarity at node P2 discharges through the discharge diode 71 to the positive pole of the accumulator 61, enabling transistor 1 to conduct relatively rapidly at the end of the discharge cycle also in the presence of a low input voltage (12 volts, for example), that is, the switched-mode power supply is in a position to build up oscillations again readily. The resistor 72 inserted between the junction P2 of the cathode of the discharge diode 71 and the feedback branch (11, 27) and the capacitor 11 serves to limit the current through the diode 71. This current-limiting resistor 72 may also be inserted between the anode of the discharge diode 71 and its connection to node P4.

The light-emitting diode 10 (LED) is on during the transformer discharge cycle, because during this period the potential at the end P4 of the secondary winding 52 is positive with respect to the potential at end P1. The resistor 82 is a current-limiting resistor. The diode 81 serves to protect the LED against overvoltage during the conductive period of transistor 1 when positive potential is present at node P1.

As described in the foregoing, reference potential is present at the low end (P7) of the voltage divider 25/23 during the transformer discharge cycle, and transistor 3 is conducting near the turn-off voltage of the accumulator 61. Resistor 25, that is, part thereof, is of the adjustable type to provide a balancing function. Resistor 23, that is, part thereof, is temperature-responsive in order to emulate the voltage characteristic of the accumulator in dependence on temperature.

During this period of current flow in the secondary circuit, the voltage value of the turn-off point of the accumulator voltage U is increased by the voltage divider 50/20 inserted between the positive pole (P4) of the accumulator 61 and node P1. The emitter of transistor 3 is connected to the junction P5 of resistors 53 and 20, resistor 53 being located between the positive pole (P4) and the emitter, and resistor 20 between the emitter and node P1. The diode 36 inserted between resistor 20 and node P1 serves a decoupling function during the conductive state of transistor 1, that is, when positive potential prevails at node P1.

During the transformer discharge cycle, this voltage divider 53/20 causes an increase in the turn-off voltage by a value of about (R53:R20)×U (neglecting resistor 53 because it is very small as compared with resistor 20), where R50 is the resistance of resistor 53 and R20 the resistance of resistor 20.

If, on termination of the transformer discharge cycle, the accumulator voltage U has not reached the predetermined turn-off voltage as yet, transistor 3 and thus also transistor 4 will be turned off, that is, the comparator formed by transistors 3 and 4 will return to the non-conductive state. The off state of transistor 3 will also cause transistor 2 to be off, thus enabling transistor 1 to conduct again.

However, if the accumulator voltage U has reached or exceeded the value of the turn-off point (turn-off voltage) at the end of the transformer discharge period, transistor 3 and thus also transistors 2 and 4 will remain conductive, that is, the comparator will be held in the conductive state. Transistor 2 being conducting, transistor 1 cannot go into conduction. The negative potential residing at node P1 only for the duration of secondary current flow is no longer present, nor is the voltage drop across resistor 53 thereby produced through resistor 20 and diode 36.

As a result, the trigger circuit (or comparator) KS formed by transistors 3 and 4 will not return to the off state, thus bringing transistor 1 back into conduction, until the accumulator voltage U has dropped below the turn-on voltage, that is, a lower voltage value.

The difference between the (upper) turn-off voltage and the (lower) turn-on voltage is the desired hysteresis of the trigger circuit.

By comparison with the circuit arrangement disclosed in EP 0 162 341 B1 whose trigger circuit or comparator has no hysteresis properties, such a circuit arrangement with hysteresis of the trigger circuit has the advantage that the charging current of the present arrangement is high nearly constantly up to a fully charged condition of the accumulator, as a result of which a full charge is obtained as early as after about 33 minutes (sharp kink in the turn-off characteristic of FIG. 4), whereas in the arrangement of EP 0 162 341 B1 the charging current decreases continually already from the outset, as a result of which the charging of an accumulator to full capacity takes as long as 60 minutes, approximately.

Although the charging current of the present circuit arrangement (FIG. 4) is higher, the trickle charging current which would flow after the accumulator is fully charged in the absence of an interrupting device AS1 is not higher than in the arrangement of EP 0 162 341 B1.

The interrupting device is equally applicable to the circuit arrangement known from EP 0 162 341 B1.

The mode of operation of the interrupting device AS1 illustrated in FIG. 2 will now be explained in more detail with reference to FIGS. 4 and 5.

Figure 4:
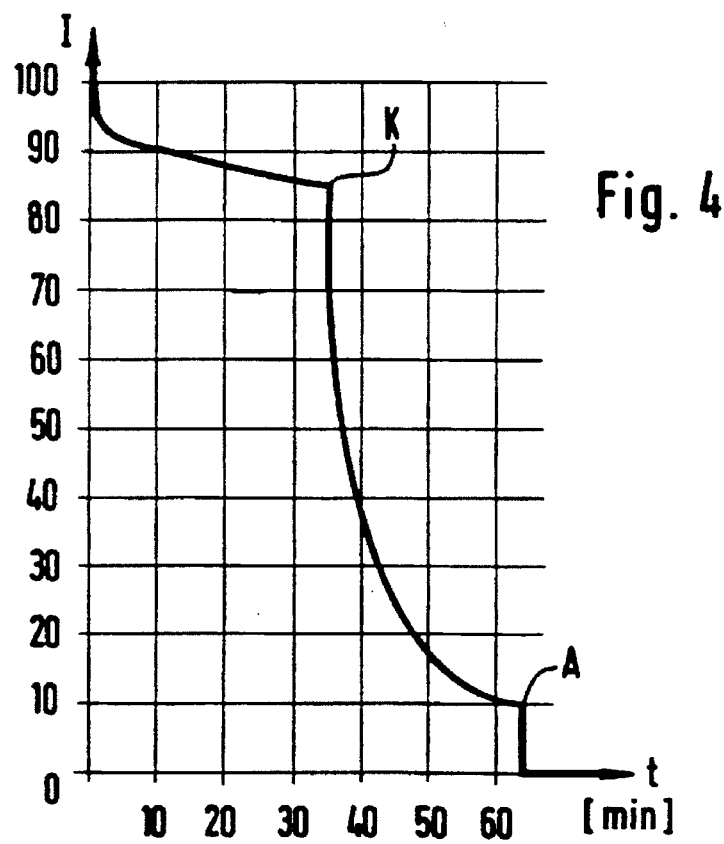
FIG. 4 is a graphical representation of the charging current in % of the initial current during charging of an accumulator, plotted as a function of the charging time in an arrangement of FIG. 2.

As becomes apparent from FIG. 4, the switched-mode power supply changes over to the pulsating mode from point K of the charging current characteristic shown. Until point A of the charging current characteristic of FIG. 4 is reached, the ratio of oscillation off-time to oscillation bursts becomes progressively greater, that is, the charging current becomes progressively lower. In the absence of the interrupting device AS1, a current amounting approximately to the continuous charging current reached at point A would then flow if no load is turned on.

Figure 5:
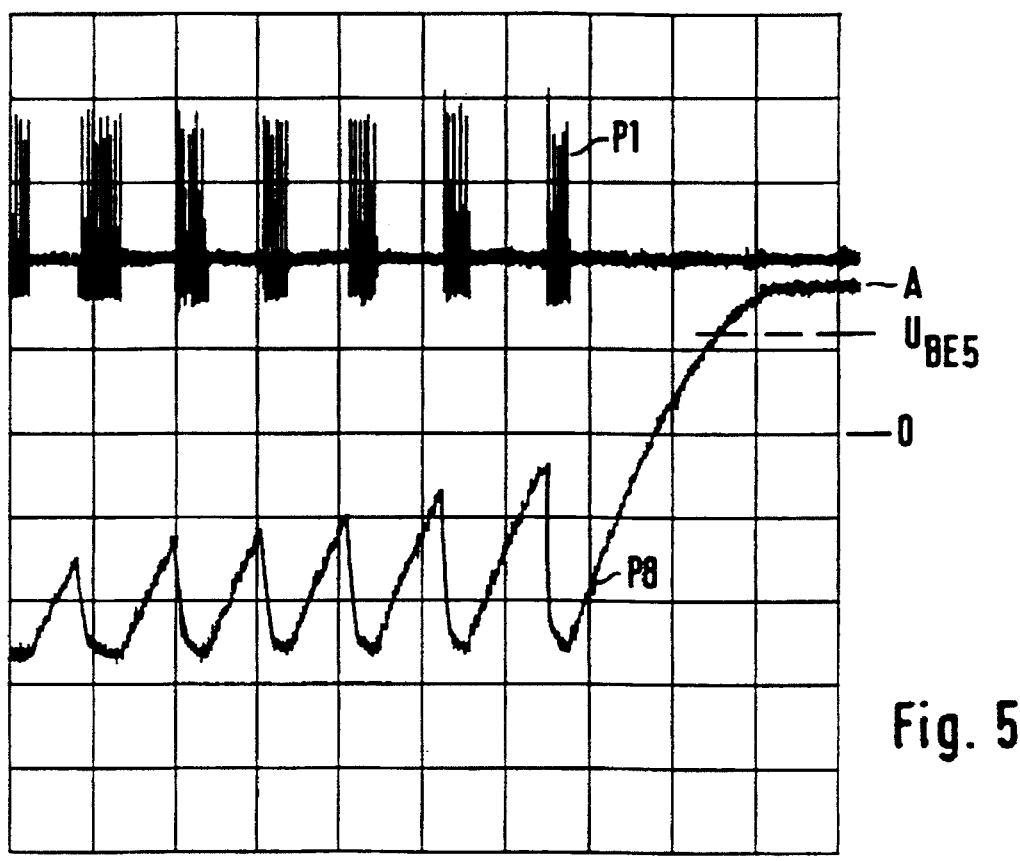
FIG. 5 is a graphical representation of the voltage at node P1 of FIG. 2 (upper curve) and at node P8 of FIG. 2 (lower curve), plotted against time.

The oscillogram shown in the upper part of FIG. 5 shows the pulsating mode of the switched-mode power supply (voltage at node P1 of the secondary winding 52 of FIG. 2) short of reaching point A of the charging current characteristic of FIG. 4. As is clearly seen, the ratio of the duration of pulse spaces to the duration of pulse bursts becomes progressively greater. The lower curve of FIG. 5 shows the voltage as it develops at the upper terminal (node P8) of capacitor 54 of FIG. 2.

At the beginning of a charging operation, that is, after an input voltage source 90 of FIG. 2 is applied, transistor 1 is enabled to build up oscillations, because driving of transistor 5 is delayed by resistor 55 and capacitor 54, such that the oscillating mode of the switched-mode power supply setting in instantaneously is in a position to produce a negative potential with respect to the emitter of transistor 5 at node P8 (base of transistor 5) through the diodes 57 and 58, causing transistor 5 to remain nonconductive.

When the switched-mode power supply changes over to the pulsating mode from point K of FIG. 4, the capacitor 54 can be charged during oscillation off-time to positive potential at node P8 through resistor 55, discharging again in the oscillating mode through the diodes 57, 58 (see FIG. 5). When the ratio of the duration of pulse spaces to the duration of pulse bursts becomes so large, that is, when a pause between pulses becomes so long that the capacitor 54 can be charged to a potential corresponding to the base-emitter turn-on threshold $U_{BE5}$ of transistor 5, transistor 5 will go into conduction, withdrawing base current from transistor 1 so that the latter remains nonconductive, thus preventing the switched-mode power supply from building up oscillations again. The resistor 56 and the twin diode 57, 58 (in lieu of only one diode) serve to enable the capacitor 54 to be charged to a higher potential than the base-emitter turn-on threshold $U_{BE5}$ or the forward voltage of a diode, causing transistor 5 to be effectively on. The time constant of the RC element comprised of resistor 55 and capacitor 54 determines from which ratio of pulse spaces to pulses transistor 5 will conduct, that is, from which ratio on the switched-mode power supply will not build up oscillations again.

In this configuration, the switched-mode power supply is not allowed to start oscillating again until it was previously disconnected from the input voltage source 90, enabling capacitor 54 to discharge. Nor would the switched-mode power supply restart oscillating if the motor 62 were started by the switch 63—with the input voltage 90 invariably applied, that is, never pulling the power plug. To avoid this, diode 59 is inserted between the junction of the two diodes 57, 58 and the reference-potential side of the motor 62. When the switch 63 is closed, reference potential will be applied to the cathode of diode 59, and capacitor 54 will discharge to a potential lying below the base-emitter switching threshold of transistor 5, causing transistor 5 to be nonconducting and enabling the switched-mode power supply to start oscillating again.

Figure 3:
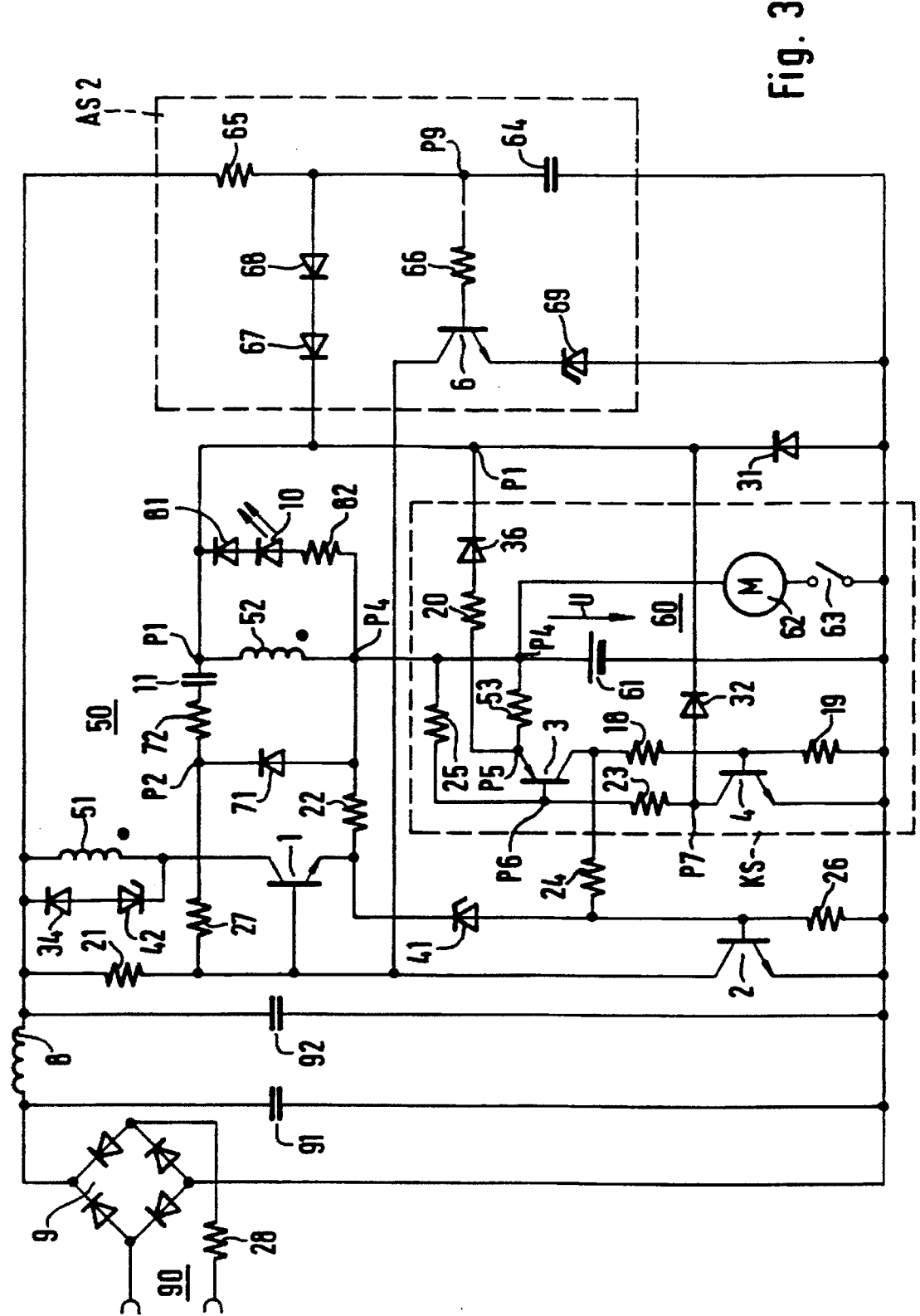
FIG. 3 is a second detailed embodiment with reference to the same circuit arrangement.

FIG. 3 shows a second embodiment of the interrupting device (AS2), equally with reference to the circuit arrangement according to German patent application No. P 41 22 544.9-32.

In this embodiment, the turn-off transistor 6 is arranged between the base of transistor 1 and reference potential, a Zener diode 69 being inserted between the emitter of transistor 6 and reference potential. The arrangement of the base resistor 66, the resistor 65, the capacitor 64 and the diodes 67, 68 corresponds to the arrangement of the base resistor 56, the resistor 55, the capacitor 54 and the diodes 57, 58 of the interrupting device AS1 of FIG. 2. The operating mode of cutting off transistor 1 from a predetermined ratio of pulse spaces to pulses and its rendering conducting again after the switched-mode power supply is disconnected from the input voltage 90 are equally identical. In this embodiment, the turn-off transistor 6 will be conducting when the voltage at the base or at capacitor 64 (node P9) is greater than the breakdown voltage of the Zener diode 69 plus the base-emitter threshold voltage of transistor 6.

The interrupting device AS2 shown in FIG. 3 differs from the interrupting device AS1 of FIG. 2 in that transistor 1 will be rendered conducting also when the accumulator voltage U has dropped appreciably below the set point corresponding to a fully charged condition, falling, for example, to nearly 50% thereof. When the base-emitter threshold voltage of a transistor is $U_{BE}=0.6$ volts, and the breakdown voltage (Zener voltage) of the Zener diode 69 is $U_{Z69}=1.7$ volts, transistor 6 will conduct when a voltage of 2.3 volts or higher lies at node P9 with respect to reference potential.

With transistor 6 conducting, a Zener voltage of $U_{Z69}=1.7$ volts, approximately, will reside at the base of transistor 1 (neglecting the collector-emitter voltage drop of transistor 6). Where a single-cell accumulator 61 is used, the voltage U is about 1.45 volts when fully charged. Because the emitter of transistor 1 is connected to the positive pole (P4) of the accumulator 61 through resistor 22, transistor 1 is not allowed to conduct until the accumulator voltage U present at the emitter has dropped to such a value that the base-emitter threshold voltage of $U_{BE1}=0.6$ volts is attained. In the present example, this would be the case at an accumulator voltage of U=1.1 volts. Then $U_{Z69}-U=U_{BE1}=0.6$ volts. Following the on-state of transistor 1 which is then started, the subsequent off-state will cut off transistor 6 through the diodes 67, 68, enabling the accumulator to be recharged.

I claim:

1. An electronic switched-mode power supply for supplying current from an input voltage source to an accumulator and to an electrical load adapted to be switched on, the power supply comprising:
   a self-oscillating flyback converter having:
      a first transistor with a base and a collector-emitter circuit;
      a first diode;
      a resistor;
      a feedback circuit;
      a control circuit;
   a transformer having:
      a primary winding connected in a series arrangement with the collector-emitter circuit of the first transistor, the resistor and the accumulator, the series arrangement connected in parallel with the input voltage source,
      a secondary winding connected in series with the accumulator and the first diode, the base of the first transistor connected to the secondary winding through the feedback circuit, in addition to being coupled to the control circuit which inhibits conduction of the first transistor when a voltage at the accumulator has reached a predetermined upper turn-off value, and enables the first transistor to conduct after the voltage at the accumulator has dropped below said upper turn-off value or a predetermined lower turn-on value;
   an interrupting device which turns the first transistor off for a prolonged period to discontinue flow of trickle charging current to said accumulator when, with the switched-mode power supply in a pulsating mode, the ratio of oscillation off-time to the duration of oscillation bursts exceeds a predetermined magnitude.

2. The electronic switched-mode power supply as claimed in claim 1, wherein
   the ratio of oscillation off-time to the duration of oscillation bursts corresponds to a level of trickle charging current applied to the accumulator.

3. The electronic switched-mode power supply as claimed in claim 1, wherein
   the interrupting device enables the first transistor to conduct when the switched-mode power supply is disconnected from the input voltage source.

4. The electronic switched-mode power supply as claimed in claim 1, wherein
   the interrupting device enables the first transistor to conduct when the electrical load is switched on.

5. The electronic switched-mode power supply as claimed in claim 1, wherein the interrupting device enables the first transistor to conduct when the voltage at the accumulator has dropped below a value lying significantly below the predetermined lower turn-on value.

6. The electronic switched-mode power supply as claimed in claim 1, wherein the interrupting device comprises a turn-off transistor coupled between the base of the first transistor and at least one of a reference potential and a positive terminal of the accumulator, the base of said turn-off transistor being coupled to a capacitor which is charged during oscillation off-time of the switched-mode power supply and is discharged when the switched-mode power supply is in the oscillating mode.

7. The electronic switched-mode power supply as claimed in claim 6, wherein the base of the turn-off transistor is connected to reference potential through the capacitor (54), to a potential obtained from the positive pole of the input voltage source through a resistor, and to an end of the secondary winding through a second diode.

8. The electronic switched-mode power supply as claimed in claim 7, further comprising a switch, wherein the base of the turn-off transistor is further connected to the end of the secondary winding through a third diode, and a fourth diode is connected between a junction point of the second and third diodes, and a terminal of the electrical load connected to the reference potential through the switch.

9. The electronic switched-mode power supply as claimed in claim 6, further comprising a second resistor, a switching device, and a fifth diode, said turn-off transistor having an emitter which is connected to reference potential through the switching device which conducts at a specified voltage, the base of the turn-off transistor connected to reference potential through the capacitor, to a potential obtained from the positive pole of the input voltage source through the second resistor, and to an end of the secondary winding through the fifth diode.

10. The electronic switched-mode power supply as claimed in claim 1, wherein the control circuit further comprises a trigger circuit which monitors the voltage of the accumulator, a zener diode, a second transistor having a base, and a starting resistor connected to the input voltage source and the second transistor is connected to reference potential, the base of the second transistor connected through the Zener diode to the emitter of the first transistor and to the trigger circuit, said trigger circuit inhibits conduction of the first transistor when the voltage at the accumulator has reached a predetermined upper turn-off value, and conducting the first transistor when the voltage has dropped below the predetermined lower turn-on value.

11. The electronic switched-mode power supply as claimed in claim 10, wherein the trigger circuit further comprises a sixth diode, a third transistor having a base and an emitter, a fourth transistor having a collector and emitter connected to reference potential, a first voltage divider connected between one end of the secondary winding and the accumulator, and a second voltage divider connected between the accumulator and the collector of the fourth transistor, the emitter of the third transistor being connected to the first voltage divider, the base of the third transistor being connected to the second voltage divider, the collector of the fourth transistor further connected, through the sixth diode, to one end of the secondary winding, and both the second transistor and the fourth transistor are driven by the third transistor.

* * * * *